June 22, 1937.  J. H. GOLDMAN  2,084,582
ART OF BONDING OR PLYING BODIES
Filed Oct. 16, 1934

Inventor
Joshua H. Goldman
by Wright, Brown, Quinby & May
Attys

Patented June 22, 1937

2,084,582

UNITED STATES PATENT OFFICE 2,084,582

ART OF BONDING OR PLYING BODIES

Joshua H. Goldman, Boston, Mass.

Application October 16, 1934, Serial No. 748,444

6 Claims. (Cl. 210—204)

This invention relates to the art of bonding or plying bodies. While not restricted thereto, it relates more particularly to the bonding or plying of comparatively thin fibrous sheet material, such as paper, paper board, textile fabrics, wood veneer, etc. into multi-ply or laminated structures whose plies or laminae are so tenaciously bonded together as to constitute in effect an integral structure.

In making boards of considerable thickness or body from sheets of paper, paper board, or the like, it is customary practice to produce comparatively thin sheets on a papermaking machine and to superpose and bond together a plurality of such prefabricated sheets to the desired thickness through the use of suitable adhesive media such as pastes, glues, and cements wherein water or an organic solvent serves as the liquid vehicle for the bonding solid. The superposed sheets containing the adhesive applied therebetween are usually subjected to pressure at elevated temperature for the purpose of causing the adhesive to set or harden and thus to bond the sheets together with the desired tenacity. In those instances where the resulting plied or laminated structure is to be exposed to the action of edibles, especially of a liquid character, for instance such edibles as milk, syrup, soup, beer, alcohol, vegetable oil or the like, the ordinary commercial adhesives present the serious disadvantage that they either dissolve at least in part in the liquid edible and/or impart sufficient malodor or off-taste thereto to spoil or seriously impair them for consumption. The ordinary animal glues or caseins of commerce, starch or dextrin pastes, rubber latices or rubber cements, bitumens, and organic gums or resins fall into this category of adhesives.

In accordance with the present invention, comparatively thin sheets of paper, paper board, or the like are bonded together into multi-ply or laminated structures of the desired thickness and integrity through the use of a ductile wax as the bonding medium. The expression "ductile wax" is used herein to mean a wax which is deformable and "flows" under the application of pressure alone. There are various waxes on the market, for instance, hydrocarbon waxes of the nature of paraffin wax, which fall into the classification of ductile waxes and which are characterized by their odorlessness, tastelessness, inertness, and insolubility under ordinary temperature conditions not only in aqueous edibles but in organic liquid edibles such as vegetable oil and alcohol. Accordingly, a wide variety of liquid edibles may be exposed to such waxes without sensible impairment. I have found that when a ductile wax, such as paraffin wax, is applied in molten condition as a mist or fine spray to the surfaces of a number of paper sheets and such sheets are brought together under heavy pressure with their sprayed surfaces in contact with one another it is possible to effect such a tenacious bonding of the sheets that they cannot be separated or pulled apart without rupturing or injuring the paper bodies themselves. This result is a most surprising one and is realized only when the sheets are combined under pressure at comparatively low temperature, for instance, under prevailing atmospheric temperature. Indeed, I have found that when attempt is made to combine the sprayed sheets under pressure with the wax in hot or molten condition, no fruitful results are had, the resulting structure being one which can be readily separated into its individual or constituent plies.

In seeking to ascertain the reasons for the results that I secure, I have inspected sheets wax-sprayed in accordance with my invention under the microscope. Such examination revealed the fact that spraying of the molten wax onto the paper not only results in an anchorage or fixation of the sprayed particles to the paper base but further a deposition of more or less discrete particles of a wide variety of sizes and shapes which are exposed as the surface particles of the sheet. There are myriad of such particles; and their presence on the surface of the sheet is detectable by the naked eye and mere feel. The fact is that the sprayed surface has a decidedly pebbly or irregular appearance. When the sprayed surfaces of two or more of such sheets are brought together under cold pressure, the myriad particles presented by the surface of one of such sheets enter into the myriad fissures or pits presented by the surface of such other sheet or sheets; and, the cold pressure applied to such superposed sheets causes deformation or flow of the myriad ductile wax particles so that they interlock and/or cohere, in consequence of which the sheets become integrated or tenaciously bonded together. In this connection, it might be observed that a body of ductile wax has greater toughness or tenacity than fibrous sheet material, such as paper, wherefore, it is understandable why once paper sheets have been bonded together accordant with the present invention, it is impossible to separate them without injuring or destroying the paper body.

With the foregoing and other features and objectives in view, I shall now describe my invention with particular reference to the accompanying drawing wherein.

Figures 2, 3:
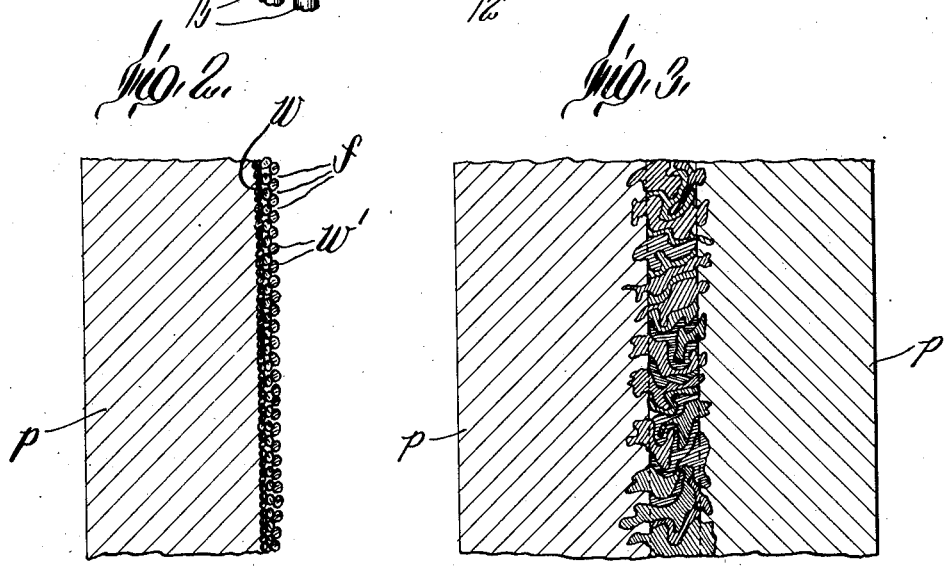
Figure 2 depicts schematically an enlarged section through a fragment of sprayed paper sheet.

Figure 3 similarly depicts two such sheets after their sprayed surfaces have been brought together and subjected to cold pressure.

Figure 4:
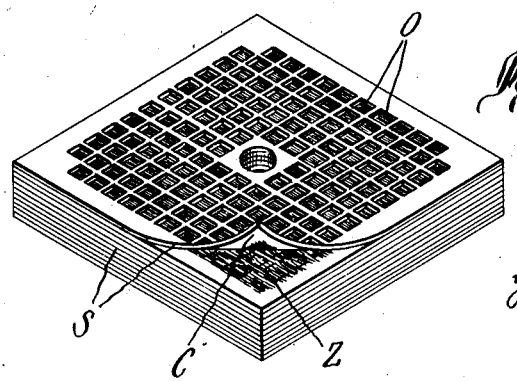

Figure 4 illustrates in perspective an ultimate article fabricated by the practice of my invention.

Figure 1:
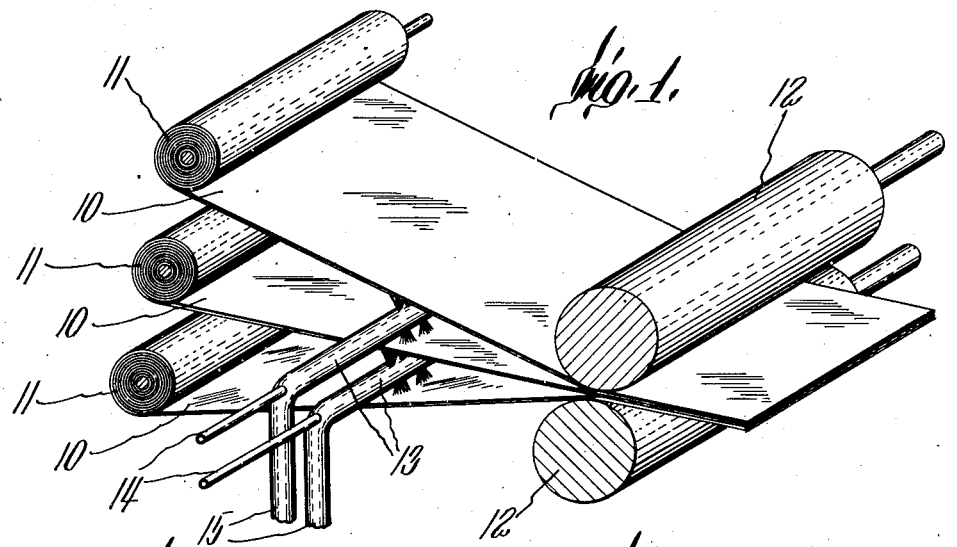
Figure 1 illustrates diagrammatically and conventionally how my invention may be practiced in producing a multi-ply or laminated paper sheet.

As shown in Figure 1, a plurality of independent thin paper sheets 10, for instance, three such sheets, may be progressively withdrawn from parent rolls 11 arranged one above the other. The sheets may be progressively led in converging relationship into the nip of a pair of heavy pressure or calender rolls 12. Before reaching the nip of the calender rolls, wherein their superposition and bonding together is effected, all of the opposing faces of the sheets are exposed to the action of a mist or fine spray of ductile wax in molten condition. As shown, the wax is sprayed from a spray pipe or manifold 13 extending laterally in the clearance or space in between each pair of sheets. Each spray pipe is equipped with a multiplicity of small openings or orifices from which the molten wax issues as exceedingly fine droplets or mist playing or showering substantially uniformly upon the paper surfaces. All of the opposed or confronting paper surfaces are thus showered upon by the sprays or jets, since, as shown, each spray pipe 13 has a row of fine openings or orifices on its upper and nether sides. The wax may be fed under pressure into the spray pipes from a suitable source of supply (not shown). Thus, paraffin wax of a melting point of, say, about 110° to 140° F., may to advantage be employed as the bonding medium, in which case the paraffin wax is melted and heated to a temperature of about 200° F. or higher preparatory to its being pumped or otherwise fed into the spray pipe. The pressure desired for spraying the molten wax is preferably had by injecting compressed air and/or superheated steam under a pressure of, say, 30 to 50 pounds gauge or greater into the spray pipe along with the molten wax so as to cause the desired disruption or atomization of the molten wax. When compressed air and/or steam is used to atomize the molten wax, it is unnecessary to pump the wax from the pool or reservoir leading to the spray pipe, as the mere injection of the compressed air and/or superheated steam into the spray pipe, as by the injector pipes 14, and its emission at high velocity through the spray openings develop sufficient suction in the spray pipe to cause the molten wax to be drawn or sucked through the supply pipe 15 leading from the pool of molten wax to the spray pipe. Generally speaking, it is preferable to employ ductile waxes of a melting point of about 120° to 130° F. as the bonding media, since such waxes not only lend themselves readily to spraying under preferred practical conditions, but they are possessed of a ductility or deformability that makes for optimum bonding of the paper sheets.

As the sprayed paper sheets progressively pass into the nip of the pair of heavy pressure or calender rolls 12, they are tenaciously bonded together or integrated, as hereinbefore described.

It is preferable to subject the sprayed sheets to cold pressures in the order of magnitude of about 100 pounds or more per square inch, since otherwise the desired deformation or "flow" of the cold wax particles necessary to ensure the desired bonding action is not attained to the desired degree. Before a sprayed sheet enters the calender rolls, it presents roughly the surface appearance illustrated in Figure 2. As shown in this figure, the surface of the paper sheet $p$ carries myriad fine wax particles $w$, those next to the paper surface having penetrated only slightly but sufficiently into the paper base to ensure the desired anchorage thereto. The surface wax particles $w'$ are fused to the underlying wax particles but they occur in a more or less individualized or spaced relationship with pits or fissures $f$ therebetween. In other words, the fine wax particles that first impinge upon the paper base are fused thereto with more or less penetration into the paper base, whereas the fine particles that impinge upon previously deposited particles are fused and made coherent thereto while at the same time solidifying or congealing in a more or less discrete or individualized condition. The surface particles are of a wide variety of sizes and configurations and the recesses or clearances therebetween are also similarly widely variant in size and shape. When two such sheets are brought together under heavy pressure with their sprayed surfaces in contacting relationship, a considerable fraction of the fine particles protruding from the face of one sheet enter into the recesses or clearances between the particles of the other sheet and under the influence of heavy pressure the intermeshing particles are deformed and caused to "flow" so as to lock together and in effect become amalgamated as a single coherent body, as illustrated in Figure 3. Again, I wish to repeat that these results are not attainable when the wax particles on the sprayed sheets are fused by heat. Nor are they realized when the wax is applied to the surfaces of the paper sheets by the usual practices of dipping the paper sheets in molten wax, spreading or painting the molten wax thereupon, or by any other mode of application with which I am familiar.

By employing the principles of my invention, it is possible to produce a wide variety of ultimate products, for instance, multi-ply boards such as serve for insulating, waterproofing, building, and other purposes. One important sphere of application of my invention wherein the finished multi-ply product is intended to contact with liquid edibles of the character already mentioned is in the fabrication of filter pads of the type disclosed in Patent No. 1,955,158, issued April 17, 1934 to Meurice T. Wells. Such a filter pad is illustrated in Figure 4 and is made up of a succession of alternating carded webs $z$ of cotton or other suitable fibers and substantially impermeable pulp board spacers $s$ having a plurality of independent columns of aligned openings $o$ therethrough. Each of the carded fiber webs is confined between a pair of such spacers and serves as an individual filter layer, the liquid being filtered being capable of passing through the layers as it proceeds through the independent columns of aligned openings and hence undergoing in effect multi-stage filtration in a plurality of independent filtering cells or compartments. As pointed out in that patent, the carded webs of cotton fibers or the like is preferably of a thickness of only about .003 to .010 inch and the length of staple therein is such that it bridges the maximum span of the spacer openings. In using such filter pads, trouble was encountered in the filtration of milk and other liquid edibles by reason of the fact that the superposed plies or laminae of pulp board and carded webs were stuck together by the usual adhesives, in consequence of which the liquid edibles filtered by such pads were found to be either contaminated and/or off-taste. Further, many such adhesives lost their bonding power under the dissolving action of the liquid being filtered so that the pad either disintegrated or leaked badly in service. The foregoing serious difficulties are obviated when principles of the present invention are adopted in building up the multi-ply or laminated pad structure. In so doing, the practice is to spray the pulp board spacers on their confronting surfaces, as with a hand-operated spray gun, with molten paraffin wax, as hereinbefore described, and to lay in between the spacers the carded webs of cotton fibers or the like to serve as the filter layers. Once a pad of the desired thickness or depth has been built up by superposing in alternation carded webs of cotton fibers or the like and substantially impermeable pulp board spacers carrying the sprayed wax on their confronting surfaces, the pad structure may be subjected to cold pressure in an ordinary hydraulic press capable of developing at least 100 pounds pressure per square inch. Under such pressing action, the pulp board spacers become tenaciously bonded together despite the existence of the carded webs of cotton fibers in between the adjacent pulp board separators. The reason why the desired bonding action is realized is because the carded webs of cotton fibers are so tenuous and compressible that under compressive force the particles protruding from the adjacent sprayed surfaces readily penetrate the carded webs so as to intermesh and permit of their being interlocked as they undergo deformation or "flow" on account of such force. The carded webs of cotton fibers are thus fixed in situ in between the spacers in myriad localities, the carded webs becoming embedded in effect in a more or less continuous phase of paraffin in between the contacting spacer surfaces, which serves to inhibit both creeping or displacement of the carded webs of cotton fibers and leakage of liquid from the filter cells to the side walls of the pad as well as leakage from one filter cell to another. In order to show up a carded web z to good advantage, a corner c of the top spacer s has been shown turned up in Figure 4.

In fabricating multi-ply papers, boards, filter pads or similar fibrous products pursuant to my invention, it is preferable, though not necessary, to size the bodies of the component plies, preferably with wax of a quality similar to that used in spraying the surfaces of the plies prior to their superposition and union. By so doing, it is possible to minimize the amount of wax necessary for spraying the surfaces to be bonded together, as only a slight amount of the sprayed wax passes into and is absorbed by the pre-sized plies. When the plies have been pre-sized with wax of the same nature as that used in the spray-coating operation, the sprayed wax particles initially contacting with the plies fuse more or less with the wax existing in the body of the plies so as to form an autogenous weld therewith. Of course, it is possible to pre-size the paper or paper board plies as is customarily done in papermaking practice, that is, either by adding the size, such as water-dispersed paraffin wax to the papermaking stock in the beater engine and precipitating the size on the stock preparatory to the papermaking operation, or by sizing the prefabricated paper or paper board. Thus, the pulp board spacers employed in fabricating a filter pad embodying the present invention may be body-sized with, say, about 2% to 10% of paraffin wax, based on the dry weight of the pulp or fibrous material.

In practicing the present invention wax coatings of various thicknesses may be sprayed onto the bodies to be combined. Thus, in preparing paper or paper board plies for union or combination into a multi-ply or laminated structure, in accordance with my invention, I have found it possible to produce the desired results by spraying the wax to a thickness as low as about .003 inch. In some instances, the wax may, of course, be advantageously sprayed in amount to deposit a coating of much greater thickness.

The principles of the present invention may be extended to the bonding of a wide variety of bodies, including those of a non-fibrous nature, but they are especially valuable as applied to the bonding of comparatively thin flexible sheets into a multi-ply or laminated structure. So far as I am at present aware, the greatest utility of my invention is in the field of multi-ply or laminated paper or paperboard structures of such thickness as cannot be realized commercially on papermaking machines of the conventional types, that is, machines of either the Fourdrinier or multi-cylinder type. The multi-ply or laminated structures embodying my invention may advantageously be put to uses where they contact with liquid edibles without contaminating such edibles, although they are not, of course, limited merely to such uses. Another highly important sphere of utility of the present invention is in the fabrication of multi-ply or laminated filter pads, such as have been described, which are to be used in the filtration of various liquid edibles. An important advantage residing in my invention as applied to the fabrication of such filter pads is that the pulp board spacers carrying the sprayed coats of wax thereupon and thus conditioned for assembly with the carded webs of cotton fibers into the filter pad are in a "dry" or non-sticky state and may thus be handled with facility and without gumming either the operator's hands or the carded webs of cotton fibers, wherefore, the tender carded cotton fibers are not subject to injury or being stuck in a misplaced position in between the spacers. It might be remarked that the usual adhesives of commerce cause serious difficulty when used in the fabrication of such filter pads, not only being troublesome for the reasons already indicated, but slowing up the productivity of an operator and necessitating fussy or careful operators.

The expression "ductile wax" is used herein not only in the sense already defined but in a comprehensive sense to include various waxy or wax-like bodies, such as Montan wax, carnauba wax, candelilla, ceresin, beeswax, etc., which, for the purposes of the present invention, behave more or less like paraffin wax.

I claim:—

1. A filter pad made up of a succession of bonded alternating carded webs of fiber and substantially impermeable pulp board spacers having a plurality of columns of aligned openings therethrough, the confronting faces of said spacers being sprayed with ductile wax and presenting multitudinous projecting wax particles, the particles on one face being interlocked with those on another and serving to fix the web therebetween.

2. A filter pad made up of a succession of bonded alternating carded webs of fiber and substantially impermeable pulp board spacers having a plurality of columns of aligned openings therethrough, the confronting faces of said spacers being sprayed with paraffin wax and presenting multitudinous projecting wax particles, the particles on one face being interlocked with those on another and serving to fix the web therebetween.

3. A method of fabricating a filter pad made up of a succession of bonded alternating fluid-permeable webs of fiber and substantially fluid-impermeable spacers having a plurality of columns of aligned openings therethrough, which comprises spraying the faces of the spacers intended to be in bonded contact with one another with molten ductile wax under conditions to deposit said wax with multitudinous irregularities on said faces, superposing in alternation the webs of fiber and the wax-sprayed spacers, and subjecting the resulting structure to cold pressure, thereby bonding together such spacers and webs by said sprayed wax deposits.

4. A method of fabricating a filter pad made up of a succession of bonded alternating carded webs of fiber and substantially impermeable pulp board spacers having a plurality of columns of aligned openings therethrough, which comprises spraying the faces of the spacers intended to be in bonded contact with one another with molten paraffin wax under conditions to deposit said wax with multitudinous irregularities on said faces, superposing in alternation the carded webs of fiber and the wax-sprayed spacers, and subjecting the resulting structure to cold pressure in order of magnitude of at least about 100 pounds per square inch, thereby bonding together said spacers and webs by said wax deposits.

5. A filter pad made up of a succession of bonded alternating fluid-permeable webs of fiber and substantially fluid-impermeable spacers having a plurality of columns of aligned openings therethrough, said spacers and webs being bonded together by multitudinous interlocked minute wax projections in coatings of such wax carried by the confronting surfaces of said spacers and said projections passing through said webs so as to interlock with projections on adjacent spacers.

6. A filter pad made up of a succession of bonded alternating fluid-permeable webs of carded fiber and substantially fluid-impermeable pulp board spacers having a plurality of columns of aligned openings therethrough, such spacers and webs being bonded together by multitudinous interlocked minute wax projections in coatings of such wax carried by the confronting surfaces of said spacers and said projections passing through said webs so as to interlock with projections on adjacent spacers.

JOSHUA H. GOLDMAN.